Patented Nov. 2, 1965

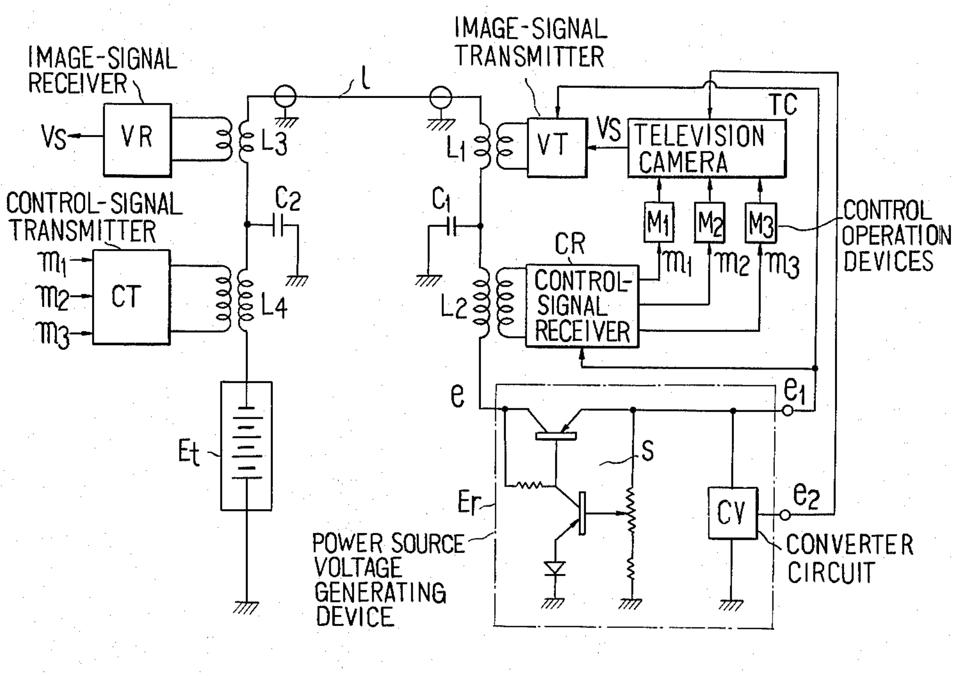
IMAGE-SIGNAL RECEIVER
VS
VR
L3
l
IMAGE-SIGNAL TRANSMITTER
TC
VT
VS
TELEVISION CAMERA
L1
C2
C1
CONTROL-SIGNAL TRANSMITTER
m1
m2
m3
CT
L4
M1
M2
M3
CONTROL OPERATION DEVICES
CR
CONTROL-SIGNAL RECEIVER
L2
m1
m2
m3
e
e1
Et
S
Er
CV
e2
POWER SOURCE VOLTAGE GENERATING DEVICE
CONVERTER CIRCUIT United States Patent Office 3,215,774

3,215,774

SINGLE LINE REMOTE CONTROL AND SIGNAL SYSTEM FOR TELEVISION CAMERAS

Kazutoshi Ikegami, Kitatama-gun, Tokyo-to, Japan, assignor to Kabushiki Kaisha Hitachi Seisakushuo, Tokyo-to, Japan, a joint-stock company of Japan Filed Mar. 8, 1963, Ser. No. 263,790
Claims priority, application Japan, Mar. 10, 1962, 37/9,453
5 Claims. (Cl. 178—6.8)

This invention relates to a new system for remote control of television cameras.

In the case when a television camera is to be controllably operated from a remote point, it is necessary, in general, to couple the camera side and the controlling side by means of the following three kinds of lines.

(1) A line for transmitting the image signal obtained from the television camera.

(2) A line for transmitting control signals for control operation of said camera.

(3) A line for supplying power source voltage for operating the various devices on the camera side.

The wiring of these lines respectively between a camera side separated by a remote distance and the control side is very troublesome in actual practice.

It is an object of the present invention to provide a new system for remote control of television cameras which is so composed and arranged as to enable the functions of all of the above-mentioned lines to be accomplished by a single transmission line.

The nature, principle, and details of the invention will be best understood by reference to the following description of a preferred embodiment of the invention, when taken in conjunction with the accompanying drawing which is an electrical circuit diagram, partly in block diagram form, indicating the compositional arrangement of the embodiment.

Referring to the drawing, the television camera side and its control side are connected by a single transmission line $l$ (coaxial cable). Through this line, an image signal $V_s$ to be sent from the camera side to the control side, a control signal $m$ to be sent from the control side to the camera side, and a power source voltage $e$ are transmitted.

On the camera side, the image signal obtained by a television camera TC is amplified and modulated by an image-signal transmitter VT, the output of which is electromagnetically connected to the aforesaid transmission line $l$ by a coil $L_1$. The control signal $m$ transmitted through the line $l$ is extracted by a coil $L_2$ and decoded by a control signal receiver CR, which accordingly creates predetermined outputs $m_1$, $m_2$, and $m_3$. These outputs $m_1$, $m_2$ and $m_3$ are received respectively by control operation devices $M_1$, $M_2$, and $M_3$, which are for control operation of the aforesaid television camera TC in response to the said outputs, for example, for controlling, respectively, the vertical movement, the horizontal movement, and the focal distance of the camera. The direct-current voltage $a$ transmitted through the line $l$ is received by a power source voltage generating device $E_r$ which is composed of a stabilizing circuit S and a converter circuit CV, and which stabilizes the said voltage $e$ and generates various output voltages $e_1$, $e_2$, etc. The camera side is further provided with a bypass capacitor $C_1$ inserted as shown in the drawing so as to prevent the transmitted signal of the aforesaid image signal $V_s$ from becoming mixed into the control signal receiver side. The above-described components constitute the camera side.

On the other end of the aforesaid transmission line $l$, the various components of the control side are connected.

A coil $L_3$ is provided to extract the signal transmitted by the transmitter VT of the aforesaid signal $V_s$ from the camera side. The signal so extracted by the coil $L_3$ is amplified and detected by an image signal receiver VR which thereby reproduces the image signal $V_s$. The control side is further provided with a control signal transmitter CT for converting the various signals $m_1$, $m_2$, $m_3$, etc., for control operation of the television camera TC into predetermined signals, a coil $L_4$ for connecting the output of the said transmitter to the transmission line $l$, a bypass capacitor $C_2$, and a direct-current voltage source $E_t$.

In the system of the above-described compositional arrangement, by transmitting the image signal $V_s$ by means of the transmitter VT on a carrier wave of high frequency, for example, of a number of tens to a number of hundreds of megacycles per second, and the control signal $m$, on the other hand, by means of the control signal transmitter CT on a carrier wave of low frequency, for example, of a number of hundreds of cycles per second, it is possible to separate these two signals, without their becoming mutually mixed, on the control side and the camera side. Furthermore, since the direct-current power source voltage $e$ is stabilized by the stabilizing power source, even when the loss in the transmission line $l$ varies, the supply of stable power source voltage is possible also to the various components on the camera side.

It is a significant advantage of the system of the present invention, as exemplified in the above-described embodiment, that transmission of all signals is made possible merely by connecting the control side and the camera side by means of a single transmission line.

Although the present invention has been described in conjunction with a particular embodiment thereof, it is to be understood that modifications and variations may be resorted to therein without departing from the spirit and scope of the invention, as those skilled in the art will readily understand, and such modifications and variations are to be considered as being within the purview and scope of the invention and appended claims.

What is claimed is:

1. A television camera operable with a remote control apparatus comprising: a single pair transmission line connecting the said television camera and the said remote control apparatus; the television camera provided with means for modulating an image signal obtained from the said television camera and transmitting the said signal through the said transmission line to the said remote control apparatus, means for extracting and decoding camera control signals from the said transmission line, control operation means for control operation of the said television camera in response to the said decoded control signals, and means for obtaining, from the said transmission line, power source voltage necessary for operation of the various means for operating the said television camera; remote control apparatus consisting of means for transmitting the said control signals to the said television camera through the said transmission line, means at said remote control apparatus for reproducing the said image signal transmitted from the said television camera through the said transmission line, and a power source voltage connected to the said transmission line.

2. In a system for the supply of operating power to, and the remote control of, a television camera located at a first station, from control and power supply apparatus at a second station, and for the transmission of video signals from said camera to said second station, the combination comprising:

(a) a single transmission line interconnecting said stations, (b) a direct current power source at said second station and a direct current operated power converter at said first station, (c) said source and said converter being connected in series with said transmission line to form a closed direct current loop;

(d) a low frequency control signal transmitter and a high frequency video signal receiver both inductively coupled to said transmission line at said second station, (e) a low frequency control signal receiver and a high frequency video signal transmitter both inductively coupled to said transmission line at said first station, (f) a television camera at said first station having its video signal output connected to said video signal transmitter, (g) control devices at said first station connected between said control signal receiver and said television camera to control the operation thereof, and (h) circuit means at said first station connecting the output of said power converter to said control signal receiver, said video signal transmitter, and said television camera, to supply operating power to all of said components at said first station.

3. A system in accordance with claim 2, in which said power converter at said first station includes voltage output stabilizing means.

4. A system in accordance with claim 2, in which the inductive couplings of (*d*) and (*e*) comprise transformer windings serially connected with said transmission line.

5. A system in accordance with claim 4, and high frequency by-pass condensers shunting the respective said transformer windings associated with the control signal transmitter and the control signal receiver.

References Cited by the Examiner

UNITED STATES PATENTS 2,852,600 9/58 Jenkins ---------------- 178—6

DAVID G. REDINBAUGH, *Primary Examiner.*